US011857502B1

(12) United States Patent
Baylor

(10) Patent No.: US 11,857,502 B1
(45) Date of Patent: Jan. 2, 2024

(54) ADHESIVE ATTACHMENT DEVICE FOR PACIFIERS

(71) Applicant: Gerlean Baylor, Alexandria, VA (US)

(72) Inventor: Gerlean Baylor, Alexandria, VA (US)

( * ) Notice: Subject to any disclaimer, the term of this patent is extended or adjusted under 35 U.S.C. 154(b) by 205 days.

(21) Appl. No.: 17/570,222

(22) Filed: Jan. 6, 2022

(51) Int. Cl.
*A61J 17/00* (2006.01)

(52) U.S. Cl.
CPC .......... *A61J 17/1115* (2020.05); *A61J 17/001* (2015.05); *A61J 17/109* (2020.05); *Y10T 24/1397* (2015.01)

(58) Field of Classification Search
CPC ........ A45F 5/02; Y10T 24/13; Y10T 24/1397; A61J 17/1115; A61J 17/001; A61J 17/109
See application file for complete search history.

(56) References Cited

U.S. PATENT DOCUMENTS

| | | | | |
|---|---|---|---|---|
| 7,086,121 | B2 | 8/2006 | Lippincott | |
| 10,080,707 | B2 | 9/2018 | Dunn et al. | |
| 2005/0217084 | A1* | 10/2005 | Behn | A45F 5/00 24/302 |
| 2009/0320173 | A1* | 12/2009 | Markowitz | A45F 5/02 24/3.13 |
| 2015/0224032 | A1* | 8/2015 | Dierker | A41B 13/04 606/236 |
| 2015/0224033 | A1* | 8/2015 | Moylan | A45F 5/02 24/3.13 |
| 2018/0028412 | A1* | 2/2018 | Todd | A61J 17/001 |
| 2022/0304900 | A1* | 9/2022 | Welnick | A61J 17/1115 |

* cited by examiner

*Primary Examiner* — Robert Sandy
*Assistant Examiner* — Michael S Lee
(74) *Attorney, Agent, or Firm* — Sanchelima & Associates PA; Christian Sanchelima; Jesus Sanchelima

(57) ABSTRACT

An adhesive attachment device including a pacifier, a strap assembly and an adhesive attachment assembly. A distal end of the strap assembly is connected to the pacifier. Another distal end of the strap assembly is connected to a hook attachment of the adhesive attachment. The adhesive attachment has a first side having an attachment hook and a second side having a layer of an adhesive. Adhesive can be reapplied to the second side of the adhesive attachment for using multiple times the adhesive attachment assembly. The second side of the adhesive attachment assembly is removably secured to an article of clothing of a user.

5 Claims, 5 Drawing Sheets

ADHESIVE ATTACHMENT DEVICE FOR PACIFIERS

BACKGROUND OF THE INVENTION

1. Field of the Invention

The present invention relates to attachment device for pacifiers and, more particularly, to an attachment device for pacifiers that can attach a pacifier to an article of clothing.

2. Description of the Related Art

Several designs for attachment devices for pacifiers have been designed in the past. None of them, however, include an attachment device for pacifiers that includes a reusable adhesive pad to attach the pacifier to clothing articles.

Applicant believes that a related reference corresponds to U.S. Pat. No. 10,080,707 issued for a pacifier with a strap and a clip assembly. Applicant believes that another related reference corresponds to U.S. Pat. No. 7,086,121 issued for a snap fastener that is used to attach a pacifier to children's clothing. None of these references, however, teach of an adhesive attachment device for pacifiers that is comprised of a tethering strap that can be secured to a pacifier and attached to an article of clothing with a reusable pad.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an adhesive attachment device for pacifiers that prevents a pacifier from being lost.

It is another object of this invention to provide an adhesive attachment device for pacifiers that prevents a pacifier from being dropped in inconvenient places such as the ground.

It is still another object of the present invention to provide an adhesive attachment device for pacifiers that allows an infant to have easy access to the pacifier.

It is still another object of the present invention to provide an adhesive attachment device for pacifiers that includes an adhesive attachment that includes a pad that can be reapplied with an adhesive layer.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an isometric operational view of one of the preferred embodiments of the present invention 10 secured to the t-shirt of an infant.
Figure 2:
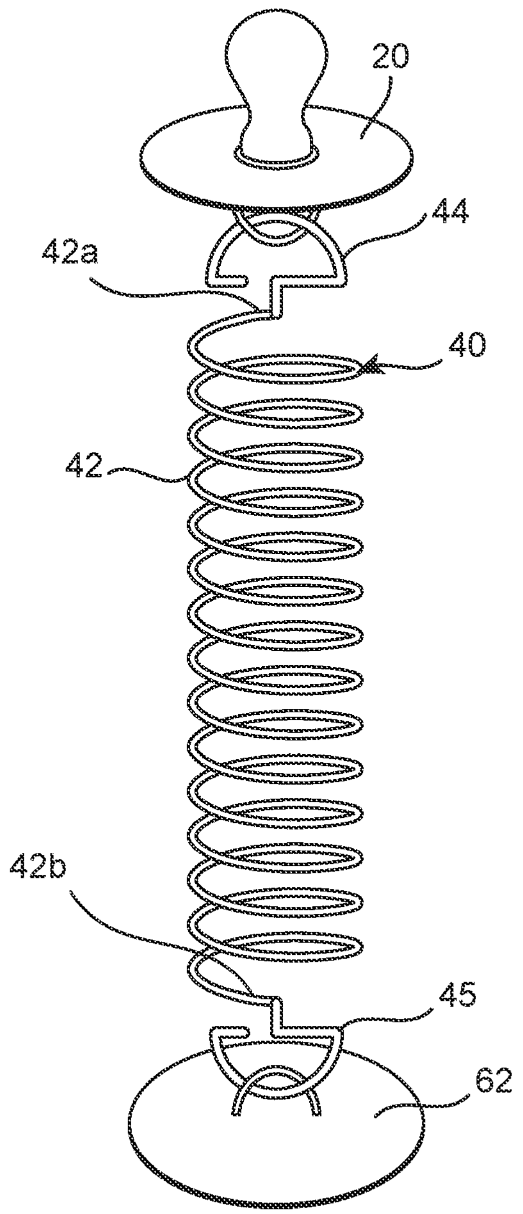
FIG. 2 shows an isometric view of one of the preferred embodiments of the present invention showing the strap 42 with connected to pacifier 20 and to the adhesive attachment 62.

Referring now to the drawings, where the present invention is generally referred to with numeral 10, it can be observed that it basically includes a pacifier 20, a strap assembly 40 and adhesive attachment assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Strap assembly 40 includes strap 42. In one embodiment strap 42 may be a spring strap. It should be understood that strap 42 may be any other kind of flexible strap. The strap 42 should be secure for infants. The strap 42 may be made of a flexible non-toxic plastic. The strap 42 may be elastic to be stretched. In one embodiment, the strap 42 may stretch 6 to 8 inches. Strap 42 may have any other dimensions. Strap 42 may have a first distal end **42*a* and a second distal end 42*b*. Strap assembly 40 may further include a first hook strap 44 and a second hook strap 45. The first hook strap 44 may be connected to first distal end 42*a*. The second hook strap 45 may be connected to second distal end 42*b***.

First hook strap 44 may have a shape of an arc. It should be understood that the first hook strap 44 may have any other suitable shape such as a semi oval shape, elliptic shape, triangular shape, rectangular shape or the like. First hook strap 44 may have a first slit **44*a* to allow securing the strap assembly 40 to any suitable item. Second hook strap 45 may have a shape of an arc. It should be understood that the second hook strap 45 may have any other suitable shape such as a semi oval shape, elliptic shape, triangular shape, rectangular shape or the like. Second hook strap 45 may have a second slit 45*a* to allow securing the strap assembly 40 to any suitable item. First strap 44 and second strap 45 may be made of a flexible plastic or any other flexible non-toxic material. First hook strap 44 may be flexible to allow first slit 44*a* to receive different items for removably secure the strap to the items. Second hook strap 45 may be flexible to allow second slit 45*a*** to receive different items for removably secure the strap to the items.

Figure 3:
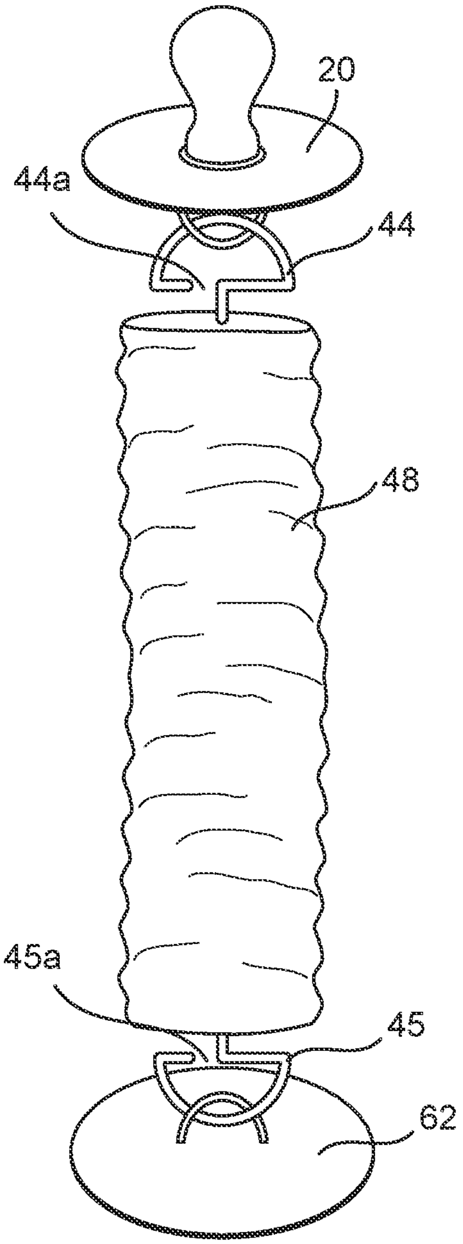
FIG. 3 illustrates an isometric view of an alternative embodiment of the present invention 10 showing the strap assembly covered by a strap cover 48.
Figure 4:
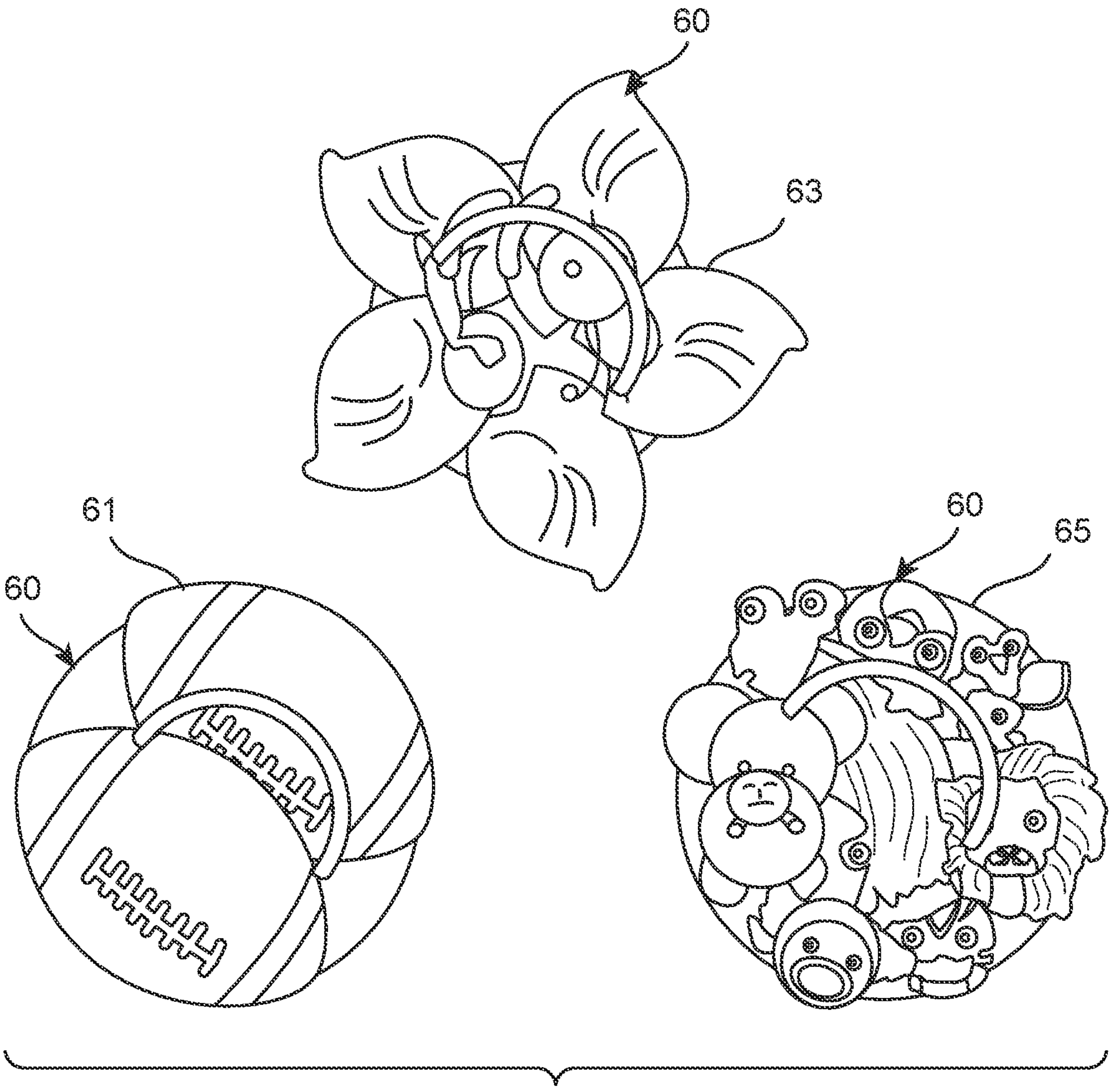
FIG. 4 is a representation of the adhesive attachment assembly 60 in alternative embodiments.

It may be suitable for the strap assembly 40 to include a strap cover 48 as observed in FIG. 3. Strap cover 48 may cover the strap 42 for additional security between infants and the strap 42. Furthermore, strap cover 48 may be decorated with a child pattern to be more attractive for infants. It also may be suitable to have strap cover 48 plain in any color. In one embodiment, strap cover 48 may be made of cloth. Strap cover 48 may also be made of a plastic, a synthetic fabric, or the like. Strap cover 48 is made of a nontoxic material. Strap cover 48 may have a substantially cylindrical hollow shape with openings at each distal end for receiving strap 42 therein. It also may be suitable to have strap cover 48 with any other shape. Strap cover 48 may be a flat piece of cloth with an attaching portion at each distal end such that the strap cover 48 may cover the strap 42 and the attaching portion may secure the strap cover 48 to the strap 42. The attaching portion of the strap cover 48 may be hook and loops, snaps, buttons, zipper or any other suitable attaching method known in the prior art. Strap cover 48 may entirely cover the strap 42.

Adhesive attachment assembly 60 includes adhesive attachment 62. In one embodiment, adhesive attachment 62 may have a circular shape. It should be understood that the adhesive attachment 62 may also have a rectangular shape, a squared shape, a triangular shape, a star shape, a polygonal shape, an oval shape, an elliptical shape, an irregular shape, or any other shape. The adhesive attachment 62 may also have a shape of a cartoon, an animal, a sport, or the like. Adhesive attachment 62 may be made of a thick bendable plastic. Adhesive attachment 62 is made of a nontoxic material.

Adhesive attachment assembly 60 may further include attachment hook 64. Attachment hook 64 may be located on a rear side of adhesive attachment 62. Attachment hook 64 may have a shape of an arc. It also may be suitable to have attachment hook 64 having any other shape such as a semi oval shape, semi elliptical shape, triangular shape, rectangular shape, polygonal shape or the like. Attachment hook 64 may be made of a plastic, or any other bendable material. Attachment hook 64 may removably or interchangeably secure the adhesive attachment 62 to the second hook strap 45 or to the first hook strap 44 via second slit 45*a* or first slit 44*a*. It should be understood that adhesive attachment 62 may be secured to the strap 42 using any other suitable securing method.

Figure 5:
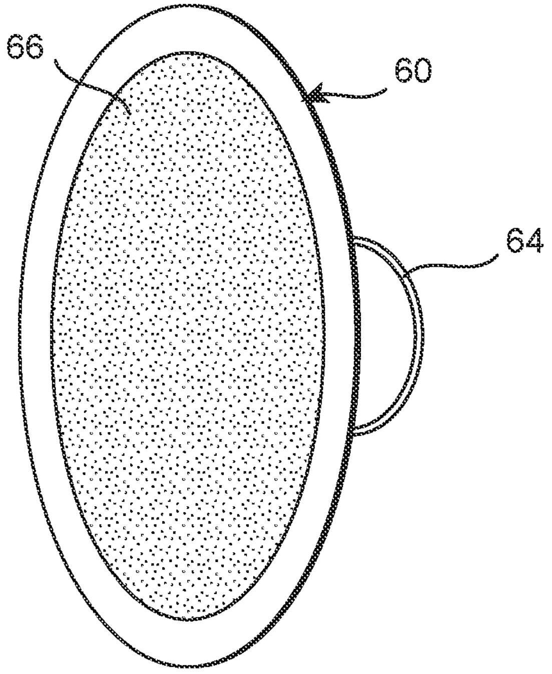
FIG. 5 is a front view of the attachment assembly showing a layer of adhesive 66 on the front portion of the adhesive attachment 60.

Best observed in FIG. 5, a front side of the adhesive attachment 62 may include a layer of an adhesive 66. Adhesive 66 may be a nontoxic adhesive. It should be noted that adhesive 66 may be applied multiple times to the adhesive attachment 62 for reusing adhesive attachment 62. Adhesive 66 may removably attach adhesive attachment 62 to infant's or toddler's shirt, jumpsuit, dress, onesie or the like.

Referring now to FIG. 5, adhesive attachment assembly 60 may include a decorative member for the adhesive attachment 62. In one embodiment, decorative member may be a ball decorative 61. In another embodiment, decorative member may be a flower decorative 63. In yet another embodiment, decorative member may be pet decorative 65. It should be understood that decorative member may include any other suitable design including bees, butterflies, any flower, any sport, or the like. Decorative member may be located on rear side of the adhesive attachment 62. Referring now to FIG. 1, pacifier 20 may be removably secured to first hook strap 44 or to second hook strap 45 and the adhesive attachment assembly 60 may be secured to the strap 62 for removably attaching the strap to a cloth of an infant so the infant can have easy access to pacifier 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An adhesive attachment device for pacifiers, comprising:

A) a pacifier;

B) a strap assembly including a strap, wherein said strap is secured to the pacifier, wherein said strap is an elastic spring strap made of an helical spring of plastic covered by a strap flexible cover made of cloth, wherein said strap has a first distal end and a second distal end, wherein said first distal end includes a first hook strap therein, wherein said second distal end includes a second hook strap therein, wherein said first hook strap is secured to a pacifier hook wherein said pacifier hook has an arch shape wherein each of said first hook strap and said second hook strap has a semiring shape with an opening on a proximal end thereof;

C) an adhesive attachment assembly including an adhesive attachment, said adhesive attachment attaches the strap to an article of clothing, wherein the adhesive attachment includes an attachment hook, wherein said attachment hook is secured to the second hook strap, wherein said attachment hook has an arc shape.

2. The adhesive attachment device for pacifiers set forth in claim 1, wherein the adhesive attachment includes a front side with a layer of adhesive for attaching said adhesive attachment to said article of clothing.

3. The adhesive attachment device for pacifiers set forth in claim 2, wherein said adhesive is capable of being applied multiple times to the adhesive attachment.

4. The adhesive attachment device for pacifiers set forth in claim 1, wherein said adhesive attachment has a decorative member.

5. An adhesive attachment device for pacifiers, consisting of:

A) a pacifier having a pacifier hook;

B) a strap assembly including a strap, wherein said strap has a first distal end and a second distal end, wherein said first distal end includes a first hook strap therein, wherein said second distal end includes a second hook strap therein, wherein said first hook strap is secured to a pacifier hook wherein said pacifier hook has an arch shape wherein each of said first hook strap and said second hook strap has a semiring shape with an opening on a proximal end thereof, said strap is an elastic spring strap made of of an helical spring of plastic covered by a strap flexible cover made of cloth, C) an adhesive attachment assembly including an adhesive attachment having a circular shape, said adhesive attachment includes a rear side having an attachment hook to secure said adhesive attachment to the second hook strap, said adhesive attachment has a front side having a layer of an adhesive that attaches the strap to an article of clothing, wherein said attachment hook has an arc shape.

* * * * *